(12) United States Patent
Hosoi et al.

(10) Patent No.: US 12,000,997 B2
(45) Date of Patent: Jun. 4, 2024

(54) ZOOM LENS AND IMAGING APPARATUS (71) Applicant: Apple Inc., Cupertino, CA (US)

(72) Inventors: Masaharu Hosoi, Campbell, CA (US); Yoshikazu Shinohara, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 277 days.

(21) Appl. No.: 17/399,856

(22) Filed: Aug. 11, 2021

(65) Prior Publication Data

US 2022/0050270 A1 Feb. 17, 2022

Related U.S. Application Data (60) Provisional application No. 63/064,730, filed on Aug. 12, 2020.

(51) Int. Cl.
  *G02B 13/00* (2006.01)
  *G02B 15/14* (2006.01)
  *G02B 15/20* (2006.01)

(52) U.S. Cl.
  CPC ....... *G02B 13/009* (2013.01); *G02B 15/1461* (2019.08); *G02B 15/20* (2013.01)

(58) Field of Classification Search
  CPC .................................................. G02B 13/009
  USPC ......................................................... 359/683
  See application file for complete search history.

(56) References Cited

U.S. PATENT DOCUMENTS

| 7,411,731 B2 | 8/2008 | Ohtake et al. |
| 7,489,450 B2 | 2/2009 | Matsumoto et al. |
| 7,511,898 B2 | 3/2009 | Matsui |
| 7,589,913 B2 | 9/2009 | Kondo |

(Continued)

FOREIGN PATENT DOCUMENTS

| CN | 1940630 | 4/2007 |
| CN | 101013191 A | 8/2007 |
| CN | 102298202 | 12/2011 |
| JP | 2018084737 | 5/2018 |

OTHER PUBLICATIONS

International Search Report and Written Opinion from PCT/US2021/045715, dated Dec. 7, 2021, pp. 1-11.
Office Action and Patent Search Report from Chinese Patent Application No. 202110925099.6, dated Apr. 13, 2024, pp. 1-11.

*Primary Examiner* — Wyatt A Stoffa
*Assistant Examiner* — Mitchell T Oestreich
(74) *Attorney, Agent, or Firm* — Robert C. Kowert; Kowert, Hood, Munyon, Rankin & Goetzel, P.C.

(57) ABSTRACT

A lens system provides a zoom function (variable magnification) in a low profile camera (lens system height less than or equal to 6 mm), which may be in a cellular phone. The lens system includes at least three movable lens groups that are movable along a common optical axis. Each of the three movable lens groups is coupled to a corresponding actuator. Responsive to a request for a change in focal length or magnification, a controller sends a corresponding signal to each of the actuators that move the corresponding lens group by a corresponding distance in a corresponding direction. The various movable lens groups may be moved by different distances and in different directions of movement. An f-number of the lens system is less than f/3.0. Focusing of an image cast onto an image sensor is accomplished by adjusting the position along the optical axis of one of the movable lens groups.

17 Claims, 6 Drawing Sheets

(56) References Cited

U.S. PATENT DOCUMENTS

| | | |
|---|---|---|
| 7,630,139 B2 | 12/2009 | Souma |
| 8,411,361 B2 | 4/2013 | Take |
| 9,557,627 B2 | 1/2017 | Mercado |
| 10,429,614 B2 | 10/2019 | Mercado |
| 2008/0180811 A1* | 7/2008 | Nishimura ......... G02B 15/1461 359/692 |
| 2008/0218875 A1 | 9/2008 | Kuroda et al. |
| 2010/0182704 A1 | 7/2010 | Yamashita |
| 2010/0271601 A1 | 10/2010 | Amano |
| 2011/0102640 A1 | 5/2011 | Iiyama |
| 2013/0258130 A1 | 10/2013 | Mihara et al. |
| 2019/0196148 A1 | 6/2019 | Yao et al. |

* cited by examiner

ZOOM LENS AND IMAGING APPARATUS

This application claims benefit of priority to U.S. Provisional Application Ser. No. 63/064,730, entitled "ZOOM LENS AND IMAGING APPARATUS," filed Aug. 12, 2020, and which is hereby incorporated herein by reference in its entirety.

BACKGROUND

Technical Field

This disclosure relates generally to camera systems, and more specifically to magnification in small form factor cameras and lens systems.

Description of the Related Art

The advent of small, mobile multipurpose devices such as smartphones and tablet or pad devices has resulted in a need for high-resolution, small form factor cameras that are lightweight, compact, and capable of capturing high resolution, high quality images at low F-numbers for integration in the devices. However, due to limitations of conventional camera technology, conventional small cameras used in such devices tend to capture images at lower resolutions and/or with lower image quality than can be achieved with larger, higher quality cameras. Achieving higher resolution with small package size cameras generally requires use of a photosensor with small pixel size and a good, compact imaging lens system. Advances in technology have achieved reduction of the pixel size in photosensors. However, as photosensors become more compact and powerful, demand for compact imaging lens systems with improved imaging quality performance has increased. In addition, there are increasing expectations for small form factor cameras to be equipped with higher pixel count and/or larger pixel size image sensors (one or both of which may require larger image sensors), and features such as variable image magnification, while still maintaining a module height that is compact enough to fit into portable electronic devices. Thus, a challenge from an optical system design point of view is to provide an imaging lens system that is capable of capturing high brightness, high resolution images, with variable magnification capability under the physical constraints imposed by small form factor cameras.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not being electrically powered). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., a field programmable gate array (FPGA) or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of folded lens systems are described that may, for example, be used in small form factor cameras in mobile multipurpose devices such as smartphones and tablet or pad devices. A folded lens system may include one or more prisms and/or mirrors, and a lens stack of a plurality of lens groups, each lens group including one or more refractive lens elements such that positions of different ones of the lens groups along an optical axis may be varied, enabling magnification of an image to be varied, and enabling a "zoom" feature, e.g., continuous magnification of an image of an object between two endpoints of magnification. Magnification may be defined as a ratio of object height/image height. Focal length may be defined as a distance from a lens (e.g., center of a lens) to a focal point at which incoming parallel light is focused along an optic axis of the lens.

A telephoto lens (or telephoto lens system) is a lens that has narrow field of view. Embodiments may enable the zoom feature to permit variable focal length between approximately 78 millimeters (mm) and 130 mm in 35 mm equivalent focal length (EFL). In various embodiments, the lens system always operates as a telephoto lens. For example, in embodiments, the shortest 35 mm equivalent focal length of the lens system is 78 mm. The focal length may be varied continually in some embodiments, or may be varied in discrete steps. The initial 35 mm equivalent focal length and/or final 35 mm equivalent focal length in execution of the zoom may be determined based on user input. The 35 mm equivalent focal length may be defined by an equation as follows:

$$f_{35\ mm} = f_{eff} \times 43.266/I_C$$

where "$f_{35\ mm}$" is a 35 mm equivalent focal length, "$f_{eff}$" is an effective focal length of a lens system, and "$I_C$" is an image circle diameter of a lens system.

In embodiments, the lens system comprises at least three movable lens groups, and may permit variable 35 mm equivalent focal length to be accomplished through movement along an optic axis of three (or more) of the lens groups in the folded lens system, the movement of the three (or more) lens groups occurring while other lens groups of the lens system remain fixed in their respective positions along the optical axis. The movable lens groups may be moved by actuators responsive to receipt of respective signals from a controller of a system. The controller may send the signals to the actuators responsive to a command received from, e.g., a user, such as a user of a portable device that includes the lens system as part of a camera.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Figure 1:
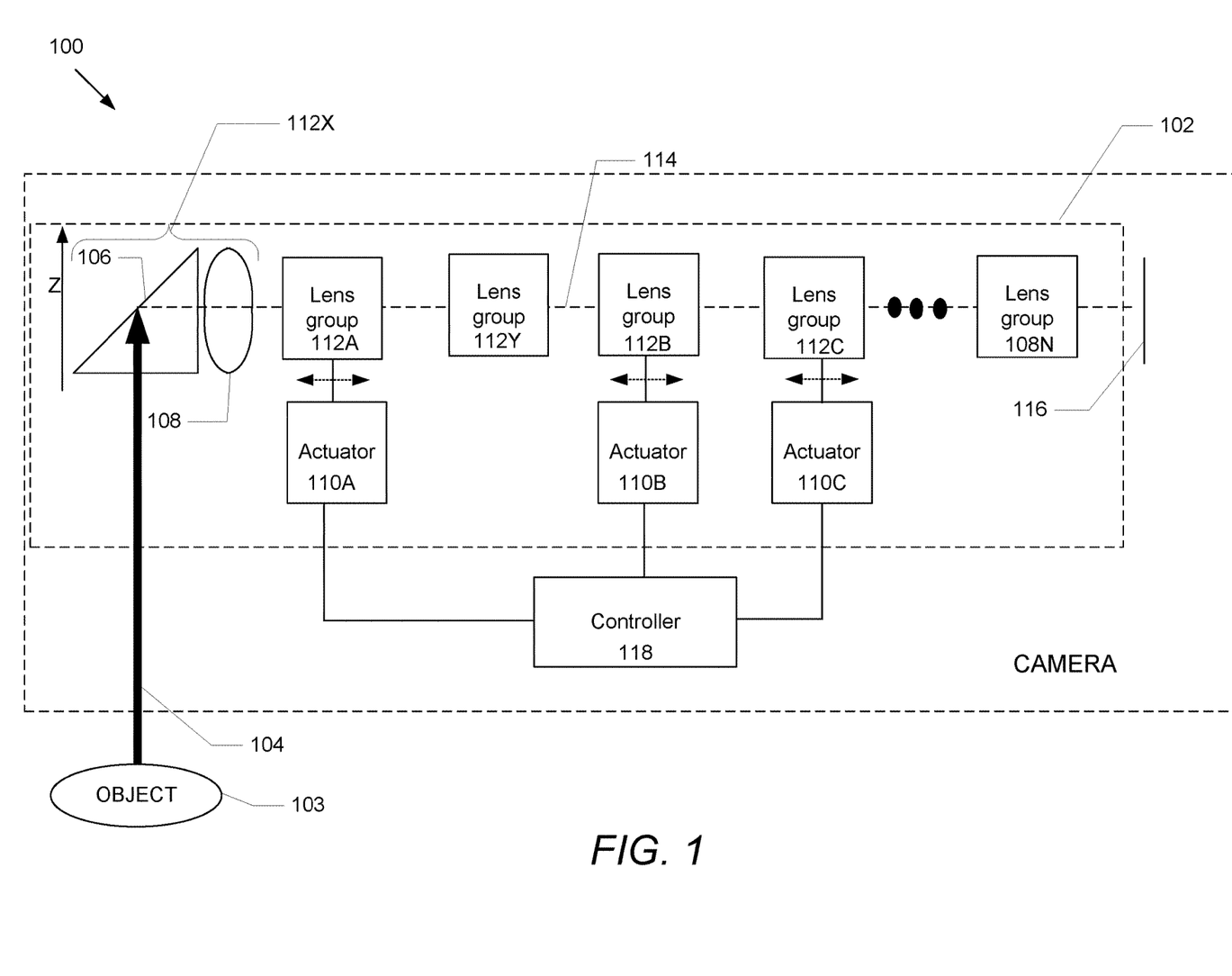
FIG. 1 illustrates a camera that includes a folded lens system with a plurality of lens groups, some of which may be moved to various locations along an optic axis, according to various embodiments.

FIG. 1 illustrates a camera 100, according to some embodiments. The camera includes a lens system 102, an image sensor 116, and a controller 118. As shown in FIG. 1, the lens system 102 includes a plurality of lens groups 112 (112X, 112A, 112Y, 112B, 112C, . . . 112N). Light that is emitted from, or reflected from, an object 103 enters the system 100 as incident light 104, which is reflected onto the optical axis 114, is refracted by the plurality of lens groups 112, and is received by the image sensor 116, on which an image may be formed. In embodiments, there is no refractive element, e.g., lens, situated between the object 103 and a light folding element 106.

Each of the lens groups 112 comprises one or more lenses that may be made from e.g., glass, a plastic material, or another material that is configured to receive light and refract the received light onto an optical axis such as optical axis 114. Lens group 112X includes a light-folding element 106 and a lens 108. As shown in FIG. 1, the light-folding element is a prism-shaped element that is configured to reflect the incident light 104 received from the object 103, onto an optical axis 114. In an embodiment, the lens 108 has a positive refractive power. In some embodiments, a mirror may be employed as the light-folding element instead of the prism 106. The lens group 112X typically remains in a fixed position on the optical axis when a change in 35 mm equivalent focal length happens, e.g., responsive to a request from a user. In embodiments, there is not more than one lens (e.g., lens 108) situated between the light folding element and a first movable lens group 108A.

In embodiments, at least three of the lens groups 112 are movable along an optical axis 114. As indicated in FIG. 1, lens groups 112A, 112B, and 112C are movable in either direction along the optical axis 114. In other embodiments more than three of the lens groups 112 may be movable in either direction along the optical axis 114.

The controller 118 comprises circuitry (e.g., processor(s), memory, input/output circuitry, etc.) configured to, in response to a request, send signals to each of a plurality of actuators 110, each actuator configured to move a corresponding lens group to which the actuator is coupled, along the optical axis 114. As shown in FIG. 1, each of the lens groups 112A, B, C, is coupled to a respective actuator 110A, 110B, 110C. In other embodiments, more than three lens groups may be coupled to respective actuators (not shown) and may be moved along the optical axis 114 by the respective coupled actuators, responsive to respective signals received from the controller 118.

Some of the lens groups, e.g., 112X, 112Y, may remain fixed in their positions on the optical axis during a change of 35 mm equivalent focal length of the camera 100. Others of the lens groups, including movable lens groups, e.g., 112A, 112B, 112C, may change their respective positions along the optical axis 114 during a change of 35 mm equivalent focal length of the camera 100, the movable lens groups being moved by respective actuators (e.g., 110A, 110B, 110C) in response to receipt of a corresponding signal from the controller. The signals may be generated by the controller in response to a request to change 35 mm equivalent focal length of the camera 100, e.g., a request for "zoom-in" that increases 35 mm equivalent focal length from a starting 35 mm equivalent focal length to an ending 35 mm equivalent focal length.

In embodiments, a zoom-in request can result in a change from 35 mm equivalent focal length of 78 mm to up to 130 mm. In other embodiments, the starting 35 mm equivalent focal length may be greater than 78 mm. In some embodiments, the ending 35 mm equivalent focal length may be less than 130 mm. The amount of change of focal length may be indicated in the received request for zoom-in. In response to the received request to zoom-in, the controller 118 may send corresponding signals to actuators 110A, 110B, 110C, and each of the actuators 110 may move the corresponding lens group 112 by a corresponding amount in a corresponding direction along the optical axis 114. During a zoom-in operation, some of the movable lens groups may move along the optical axis 114 toward the image sensor 116, while others of the movable lens groups may move in an opposite direction (away from the image sensor 116) along the optical axis 114.

Conversely, a request may be received to "zoom-out" from a starting focal length to an ending focal length that is smaller than the starting focal length. For example, the lens system 102 may be configured to produce 130 mm in 35 mm equivalent focal length, and the zoom-out request may specify that the ending 35 mm equivalent focal length is to be 78 mm in 35 mm equivalent focal length. The controller 118, upon receiving an indication of the request to zoom-out, may issue signals to the respective actuators 110 to move the corresponding movable lens groups, each to be moved in a direction opposite to the respective direction of movement that produces a "zoom-out" increase in 35 mm equivalent focal length.

Figure 2:
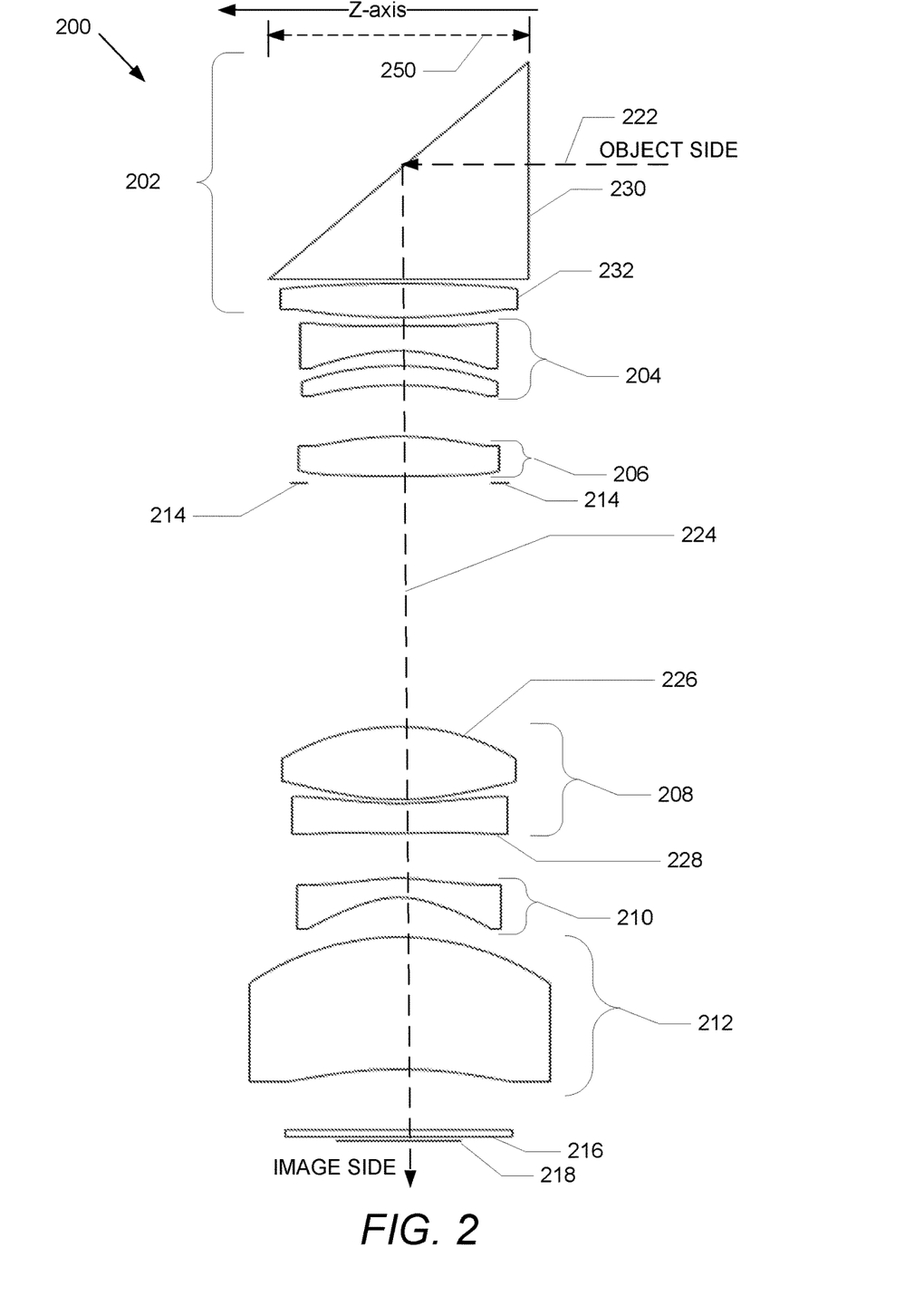
FIG. 2 illustrates a lens system including a light folding element and a plurality of lens groups, according to various embodiments.

FIG. 2 illustrates a lens system 200 that provides variable magnification of an image of an object that is within a field of view of the lens system 200, according to some embodiments. The lens system 200, as shown in FIG. 2, includes six lens groups: first lens group 202, second lens group 204, third lens group 206, fourth lens group 208, fifth lens group 210, sixth lens group 212. Also included in the depicted embodiment is aperture 214, infrared filter 216 (optional), and image sensor 218. Image sensor 218 is configured to receive light that has been projected by the lens system 200 at an image side of the lens system 200.

In an embodiment, at least three of the lens groups may be moved (e.g., repositioned) along optical axis 224. In an embodiment, the second lens group 204, the fourth lens group 208, and the fifth lens group 210 groups may be positioned along the optical axis 224, including to be repositioned from a respective initial position so as to increase or decrease a magnitude of the image that is projected onto the image sensor 218. In an embodiment, there is a total of six lens groups, and three of the six lens groups are fixed in position along the optical axis 224, and three of the six lens groups are movable along the optical axis 224, e.g., for the zoom function.

In an embodiment, first lens group 202 has a positive refractive power and includes a prism 230 and a lens 232 having positive refractive power. The prism 230 may receive light that is emitted or reflected from an object along the input axis 222, and reflect the received light so as to redirect the received light along the optical axis 224, which differs in orientation from the input axis 222. In other embodiments, a reflective surface such as a mirror may be used instead of the prism to change the direction of the light received from the object, from the input axis 222 to the optical axis 224. In embodiments, the lens system 200 has no lenses or refractive elements situated between the object side of the lens system 200 and the prism 230 (or reflective surface such as a mirror). That is, there are no refractive elements (e.g., lenses) between the prism 230 and the object from which light is emitted (or reflected) that enters the lens system 200 at the prism 230. Stated in other words, there is no refractive element (e.g., lens) located at an object side of the reflective element (e.g., prism 230) either in contact with the object side of the reflective element or located toward the object side along the input axis 222.

In an embodiment, the second lens group 204 has a negative refractive power and includes a lens with negative refractive power and a lens with a positive refractive power. In an embodiment, the second lens group 204 may be positioned as a group (e.g., the lenses of the second lens group 204 maintain fixed relative to one another) along the optical axis 224. The position of the second lens group 204 may be varied along with movement of others of the lens groups to achieve different 35 mm equivalent focal lengths. In some embodiments, the second lens group 204 has no more than two lenses and when moved along the optical axis 224 the lenses move as a unit, e.g., remain together, moving as a single unit along the optical axis 224.

In an embodiment, a third lens group 206 has a positive refractive power and includes a lens with a positive refractive power. In an embodiment, the third lens group 206 remains in a fixed position along the optical axis 224 during any 35 mm equivalent focal length change of the lens system 200. Such a 35 mm equivalent focal length change is effected by a change in relative positions of other ones of the lens groups along the optical axis 224. In some embodiments, the third lens group 206 has only a single lens (e.g., the third lens group 206 has only one lens).

In an embodiment, an aperture 214 is situated on the optical axis 224, adjacent to the third lens group 206, on a side of the third lens group 206 that is closer to the image sensor 218 than is another side of the third lens group 206, the other side of the lens group 206 being closer to the second lens group 204).

In an embodiment, the fourth lens group 208 has a positive refractive power and includes at least one lens with a positive refractive power. In the embodiment illustrated in FIG. 2, the fourth lens group 208 includes two lenses 226 and 228, at least one of which (e.g., lens 226) has positive refractive power. In an embodiment, the fourth lens group 208 has only two lenses (e.g., lenses 226 and 228). That is, in an embodiment, the fourth lens group 208 has two distinct lenses and the fourth lens group 208 has a positive refractive power. In an embodiment, the fourth lens group 208 may be positioned as a group (e.g., the lenses of the fourth lens group 208 maintain fixed positions relative to one another) along the optical axis 224, and the position of the fourth lens group 208 may be varied along with repositioning others of the lens groups to achieve, at the image sensor 218, different 35 mm equivalent focal lengths.

In an embodiment, the fifth lens group 210 has a negative refractive power and includes at least one lens having a negative refractive power. In an embodiment, the fifth lens group 210 has only one lens. In an embodiment a position of the fifth lens group 210 along the optical axis 224 may be varied along with repositioning of others of the lens groups to achieve, at the image sensor 218, different magnifications of an object from which incoming light was received by the lens system 200 at the object side and different 35 mm equivalent focal lengths.

In embodiments, the sixth lens group 212 has a positive refractive power and includes at least one lens having a positive refractive power. In an embodiment, the sixth lens group 212 has only one lens. In an embodiment, the sixth lens group 206 is configured to remain in a fixed position along the optical axis 224 during any 35 mm equivalent focal length change.

In operation, the lens system 200 is configured to provide a selectable plurality of magnifications and 35 mm equivalent focal lengths, which may be effected through changing relative positions, along the optical axis 224, of three or more of the lens groups 202, 204, 206, 208, 210, and 212. For example, in an embodiment, to effect from an initial magnification and an initial 35 mm equivalent focal length, an increase in the magnification of an image of an object whose associated light (emitted or reflected) is entrant to the lens system 200 along the input axis 222 and an increase in 35 mm equivalent focal length, the second lens group 204 may be displaced toward the image sensor 218, the fourth lens group 208 may be displaced away from the image sensor 218, and the fifth lens group 210 may be displaced away from the image sensor 218.

In embodiments, the lens system 200 contains three movable lens groups and three fixed lens groups, and zoom is accomplished by moving the positions of each of the three movable lens groups along a common optical axis 224 while each of the three fixed lens groups remains stationary in their respective positions along the optical axis 224.

In embodiments, an f number, (e.g., ratio of focal length of the system to a diameter of an entrance aperture) of the lens system 200, (notated "f/(number)"), has a value between f/2.3 and f/3.0. In embodiments, in any telephoto magnification setting of the various lenses of the lens system 200, the lens system 200 has an f number that is always less than or equal to 2.9, e.g., the f number is always <f/3.0. In certain embodiments, with the lens system 200 configured to have 35 mm equivalent focal length of 78 mm the lens system 200 has a corresponding f number of f/2.3. In certain embodiments, with the lens system 200 configured to have 35 mm equivalent focal length of 130 mm, the lens system 200 has a corresponding f number of f/2.9. In embodiments, with the lens system 200 configured to have a 35 mm equivalent focal length of between 78 mm and 130 mm in 35 mm equivalent focal length, the lens system 200 has a corresponding f number of between f/2.3 and f/2.9. In some embodiments, the f number is always f<3.0 for any 35 mm equivalent focal length configuration of the lens system.

In various embodiments, the lenses in the lens system 200 may include glass, or any of various optical grade plastics, or one or more other materials that are substantially transparent to light of wavelengths desired to be projected.

In embodiments, the lens system 200 has a total of not more than 8 lenses. In embodiments, the lens system 200 also includes only one light-folding element. In embodiments, the lens system 200 has only 8 refractive elements. In some embodiments, the lens system 200 has only 8 refractive elements (e.g., optical lenses) and only one light-folding element.

In various embodiments the fourth lens group 208 includes positive refractive power lens 226 that has an Abbe number (D) that has a value greater than 60. The Abbe number of a lens is related to chromatic aberration of the lens. Imposing the condition D>60 may help to reduce chromatic aberration of the image directed to the image sensor 218, in various embodiments.

For example, in an embodiment depicted in FIG. 2, the fourth lens group 208 includes a lenticular-shaped lens 226 that has a positive refractive power, and lens 228 that may have, e.g., a negative refractive power. In embodiments, the (positive lens) 226 has an associated Abbe number D>60, which may improve image performance across an extent of varying 35 mm equivalent focal lengths by the lens system 200 throughout a range of 35 mm equivalent focal lengths of a zoom function of a camera that utilizes a lens system similar to lens system 200.

In embodiments, the second lens group 204, with focal length B, satisfies the following relationship to a focal length C of the lens system 200 at maximum focal length of the lens system 200: $-0.6<B/C<-0.1$. This range of the focal length ratio B/C may be selected for several reasons: (1) the condition B/C<-0.6 may be imposed to avoid an increase in thickness of the lens system (e.g., to compensate for an inadequate lens power of the $2^{nd}$ lens group 204); (2) the condition B/C<-0.1 may prevent an unacceptably large lens aberration due to a large lens power of the second lens group 204, which lens aberration can cause degradation of the image that is output from the lens system 200.

In embodiments, refractive index A of prismatic element 230 satisfies the following relationship: A>1.7. Satisfaction of this condition may help to reduce an overall Z-dimension 250 (height) of the lens system. In embodiments, the Z-dimension 250 is less than or equal to 6.0 mm.

In embodiments, a lens system according to the arrangement depicted in FIG. 2, may allow a zoom function to vary 35 mm equivalent focal length of an image to between 78 mm and 130 mm of 35 mm equivalent focal length.

In embodiments similar to the embodiment depicted in FIG. 2, changes to the 35 mm equivalent focal length may be made by adjusting the respective positions of the second lens group, the fourth lens group, and the fifth lens group concurrently. In various embodiments, a change to the 35 mm equivalent focal length may be made using, e.g. stepper motors, piezoelectric actuators, voice coil motor (VCM) actuators, or another type of motion actuator. The focal length may be changed continuously (zoom) from a first 35 mm equivalent focal length to a second 35 mm equivalent focal length, e.g., from 78 mm to 130 mm or from 130 mm to 78 mm. Increasing 35 mm equivalent focal length may be referred to as "zoom-in" while decreasing 35 mm equivalent focal length may be referred to as "zoom-out."

In embodiments, the equivalent focal length may be changed in increments according to a user-specified increment, e.g. increments of 13 mm starting from 78 mm to 91 mm, to 104 mm, to 117 mm to 130 mm, with the user determining when to increase the 35 mm equivalent focal length, or a user selection of incremental change in 35 mm equivalent focal length after a specified time period, e.g., increase by 13 mm every 15 seconds (or after another period of time that may be specified, e.g., by the user). Conversely, the 35 mm equivalent focal length may be varied (continuously or in discrete steps) from a second 35 mm equivalent focal length to a first 35 mm equivalent focal length, e.g., starting at 130 mm and reducing the 35 mm equivalent focal length to 78 mm.

Figure 3A:
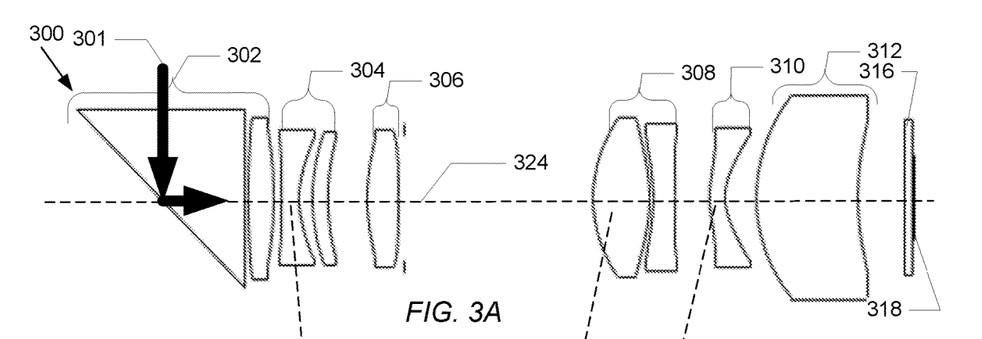
FIGS. 3A, 3B, 3C illustrate a folded lens system that produces various magnifications, according to some embodiments.
Figure 3B:
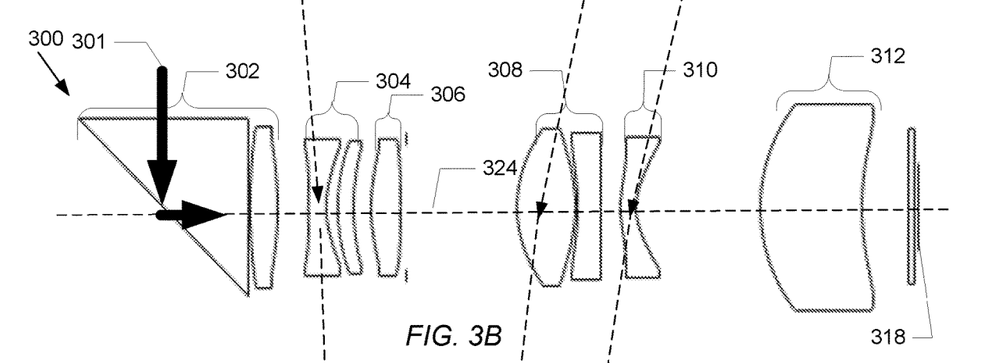
Figure 3C:
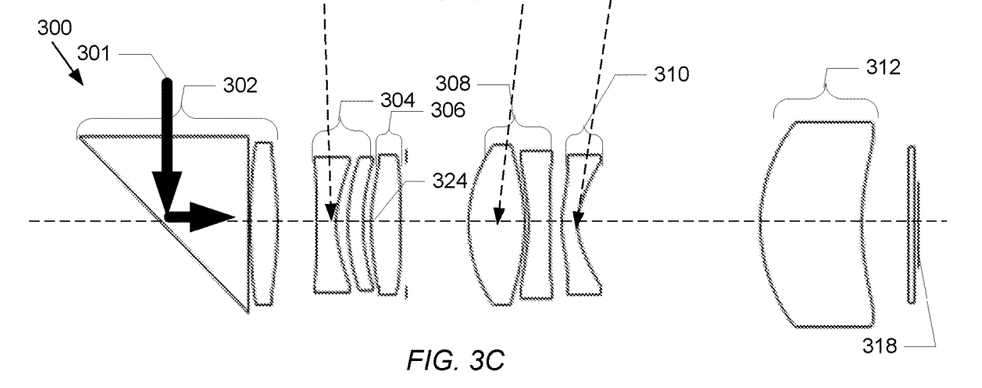

FIGS. 3 A,B,C depicts the lens system of FIG. 2 in various configurations. For each of FIGS. 3A, 3B, and 3C, various ones of the lens groups are positioned in respective positions along optical axis 324 to achieve a targeted 35 mm equivalent focal length (and associated magnification) of the lens system. That is, each of FIGS. 3A, 3B, and 3C reflects a respective configuration of the lens groups for a corresponding 35 mm equivalent focal length. FIGS. 3A, 3B, and 3C indicate relative positions of the six lens groups, and are not intended to represent actual distances between lens groups; that is, FIGS. 3A, B, C are not drawn to scale with respect to an intended 35 mm equivalent focal length of an object.

Turning to FIG. 3A, the components of lens system 300 are located along optical axis 324 in order from left to right: first lens group 302, second lens group 304, third lens group 306, fourth lens group 308, fifth lens group 310, sixth lens group 312. Also shown in FIG. 3A are (optional) infrared filter 316 and image sensor 318. The lens system 300 projects an image, on the image sensor 318, of an object (not shown) that emits and/or reflects incident light 301 received by a light-folding element (e.g., prism) of the first lens group 302. The incident light 301 is folded by the light-folding element onto the optical axis 324 and is projected as an image onto image sensor 318. The lens system 300 may be configured to provide a range of 35 mm equivalent focal lengths. For example, the lens system 300 may be configurable to provide a 35 mm equivalent focal length range between approximately 78 mm and approximately 130 mm corresponding to a change of an image size of the object from which light 301 is received. For example, to change 35 mm equivalent focal length and corresponding magnification of an image formed by the lens system 300 onto the image sensor 318, lens groups 304, 308, and 310 may be moved along the optical axis 324, each moving by a respective amount and each moved in a respective direction along the optical axis. Additionally, the image may be focused on the image sensor 318 by varying (e.g., "fine tuning" along the optical axis 324) the position of lens group 310 along the optical axis 324. In some embodiments, after changing 35 mm equivalent focal length and corresponding magnification of the image, focusing of the image is accomplished by varying the position of lens group 310 along the optical axis 324 while all other lens groups are kept in their respective positions along the optical axis 324. Lens groups 302, 306, and 312 remain fixed in their respective positions along the optical axis 324 during a change of 35 mm equivalent focal length of the lens system 300.

FIG. 3A illustrates relative positions of the plurality of lens groups at an initial magnification. FIG. 3B depicts the lens system 300 reconfigured from FIG. 3A in order to provide greater 35 mm equivalent focal length (and corresponding greater magnification) than the configuration of FIG. 3A. Three of the lens groups in FIG. 3B (304, 308, 310) are shifted in position from their positions in FIG. 3A, which results in a greater 35 mm equivalent focal length, and a corresponding higher magnification of the image produced at the image sensor. The first lens group 302 remains in the same position as in FIG. 3A. The second lens group 304 is translated toward the image sensor 318, e.g., away from the first lens group 302 and toward the lens group 306. The third lens group 306 remains stationary with respect to the image sensor 318 and with respect to the first lens group 302; that is, in FIG. 3B the third lens group 306 is not moved from its position in FIG. 3A. The fourth lens group 308 is moved away from the image sensor 318, toward the third lens group 306 and toward the first lens group 302. The fifth lens group 310 is translated away from the image sensor 318, toward the third lens group 306. The sixth lens group 312 remains fixed in position as compared with its position in FIG. 3A, and stationary with respect to the third lens group 306. After changing the position of lens groups 304, 308, and 310, additional focusing of the image directed to the image sensor 318 may be achieved by making slight adjustments ("fine tuning") of the position of the fifth lens group 310 along the optical axis 324, while each of the lens groups 304, 308 remain in their relocated positions shown in FIG. 3B.

Thus, an increase in 35 mm equivalent focal length (and corresponding magnification) may be achieved by moving (with respect to their corresponding positions as shown in FIG. 3A) the second lens group 304 along the optical axis 324 in a direction toward the image sensor 318 and away from the first lens group 302; moving the fourth lens group 308 along the optical axis 324 in a direction away from the image sensor 318; and moving the fifth lens group 310 along the optical axis 324 in a direction away from the image sensor 318, while the first lens group 302, the third lens group 306, and the sixth lens group 312 remain fixed in their corresponding positions. After moving the lens group 310 along the optical axis 324 in the direction away from the image sensor 318, focusing (e.g., fine tuning, sharpening) of the focus of the image at the image sensor 318 may be achieved by making small changes in position of the fifth lens group 310 along the optical axis 324, while each of the other lens groups that have been moved, e.g., 304, 308 remain in their relocated positions, which are relocated from their respective positions shown in FIG. 3A. In embodiments, in order to focus the image projected onto the image sensor 318 after the change magnification has been achieved, only the fifth lens group 310 is varied in its position along the optical axis 324, while each of the other lens groups 302, 304, 306, 308, 312 is maintained in its position along the optical axis 324. That is, after the desired 35 mm equivalent focal length and corresponding magnification change is achieved, only lens group 310 is varied in its location along the optical axis 324, while the other movable lens groups 304 and 308 are not moved during focusing of the image projected onto the image sensor 318.

FIG. 3C shows relative positions of each of the lens groups 302-312, some of which have been relocated with respect to their positions shown in FIG. 3B. To further increase the 35 mm equivalent focal length (and corresponding magnification) from the 35 mm equivalent focal length and magnification achieved in FIG. 3B, the second lens group 304 is translated further toward the image sensor 318 (and further toward the third lens group 306 that is fixed in position), the fourth lens group 310 is translated further away from the image sensor 318 (and further toward the third lens group 306 that is fixed in position), and the fifth lens group 310 is translated further away from the image sensor 318. The first lens group 302, the third lens group 306, and the sixth lens group 312 each remain fixed in position with respect to their corresponding positions shown in FIGS. 3A and 3B. Focusing (e.g., increasing image sharpness) of the image at the image sensor 318 may be achieved (e.g., after having moved the lens group 310 in a direction away from the image sensor 318) by making additional small changes to the position of lens group 310 along the optical axis 324.

In an embodiment, the lens system 300 can be operated as a telephoto lens system (a "zoom" lens system) that can change 35 mm equivalent focal length between, e.g., 78 mm and 130 mm in 35 mm equivalent focal length by adjusting the relative positions of the second lens group 304, the fourth lens group 308, and the fifth lens group 310, as described above. The 35 mm equivalent focal length may be increased by translation along the optical axis 324, of each of three of the lens groups: moving the second lens group 304 away from the first lens group 302 and toward the image sensor 318; moving the fourth lens group 308 in the direction away from the image sensor 318 and toward the first lens group 302; and moving the fifth lens group away from the image sensor 318 and toward the first lens group 302. Each of the first lens group 302, the third lens group 306, and the sixth lens group 312 is maintained at a fixed position in each of the 35 mm equivalent focal length configurations.

By moving each of the second lens group 304, the fourth lens group 308, and the fifth lens group 310 in a continuous fashion, a zoom-in effect, e.g., a continual change in 35 mm equivalent focal length from a smallest 35 mm equivalent focal length achievable by the lens system 300 to a largest 35 mm equivalent focal length achievable by the lens system 300, as illustrated by the progressive changes in position of lens groups 304, 308, and 310 from FIG. 3A, to FIG. 3B, to FIG. 3C.

A zoom-out effect (reduction of 35 mm equivalent focal length), may be achieved by moving the lens groups 304, 308, and 310 oppositely to their respective motions for zoom-in.

Alternatively, a range of 35 mm equivalent focal lengths may be selected, e.g., by a user, and the lens system 300 may be configured to automatically zoom within the user-selected 35 mm equivalent focal length range. In an embodiment, the user may select to "zoom in" (increase 35 mm equivalent focal length), or to "zoom out" (decrease 35 mm equivalent focal length). In some embodiments, the user may set one or more of the minimum 35 mm equivalent focal length, maximum 35 mm equivalent focal length, and rate of change of 35 mm equivalent focal length.

In an embodiment, the user may select a particular 35 mm equivalent focal length for the lens system 300, and upon a user request the lens system 300 may be automatically configured to provide the particular 35 mm equivalent focal length selected based on user input. Reconfiguration of the lens system 300 may be accomplished via one or more actuators, e.g., stepper motors, piezoelectric controllers, VCM motors, etc. controlled by one or more controllers that include one or more respective processors, the particular 35 mm equivalent focal length based on input from, e.g. the user.

In another embodiment, the lens system 300 may be configurable to have the 35 mm equivalent focal length adjusted manually based on user input, e.g., a manually entered change (e.g., knob change) may result in a reconfiguration of the lens system 300 to either increase 35 mm equivalent focal length or decrease 35 mm equivalent focal length by moving each of the lens groups 304, 308, and 310 through mechanical means such as through a combination of gears, levers, etc.

Figure 4:
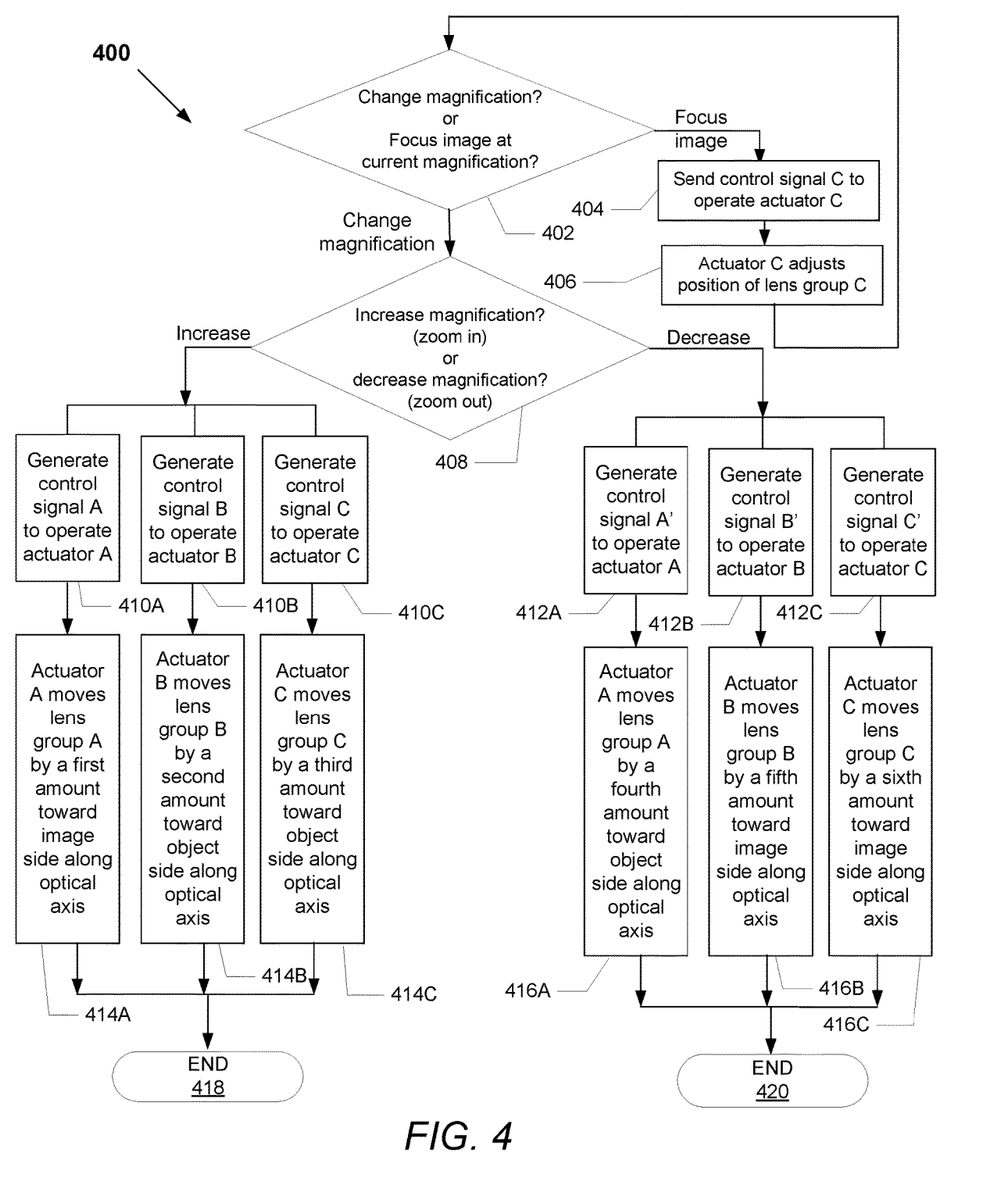
FIG. 4 is a flowchart of a method of focusing an image or of changing magnification of an image of an object, the image produced by a lens system, according to some embodiments.

FIG. 4 is a flow diagram of a method of increasing magnification of an image produced by a lens system, such as the lens systems of FIGS. 1-3.

At decision diamond 402, a selection is made as to whether a change in magnification produced by the lens system is desired, or a focus of an image at the current magnification.

If it is desired to focus the image produced by the lens system at the current magnification, moving to block 404 a controller sends one or more control signals to a single actuator C that is coupled to a single lens group (the lens group 210 of FIG. 2, also the lens group 310 of FIG. 3), which causes, at block 406 the actuator C to move the lens group to which the actuator is coupled, in small increments along the optical axis until focus is achieved (e.g., through an auto-focus feedback system, or via user feedback). The method then returns to the decision diamond 402.

If, at the decision diamond 402, a change in magnification produced by the lens system is desired, moving to decision diamond 406 it is determined whether the change in magnification is to be an increase (zoom-in) or a decrease (zoom-out) in magnification.

If an increase in magnification (zoom-in) is desired, taking the left branch of the flow chart 400, at blocks 410A, 410B, 410C control signals A, B, and C, are generated (e.g., by a controller), each of which is to operate a corresponding actuator A, B, and C. Blocks 410A, 410B, and 410C may be executed in any order, or in parallel. Responsive to the corresponding control signal received, at block 414A actuator A moves a corresponding lens group A by a first amount in a direction toward the image side. At block 414B actuator B move lens group B by a second amount in an opposite direction toward an object side (e.g., away from the image side). At block 414C actuator C moves lens group C by a third amount in the direction toward the object side (away from the image side). The distances moved by each of the lens groups A, B, C, will generally not be the same. Instead, the distances moved are determined (e.g., by control circuitry such as a controller that generates signals to the actuators) based on the change in magnification to be achieved. The method ends at 418.

If a decrease in magnification (zoom-out) is desired, taking the right branch of the flow chart 400, at blocks 412A, 412B, 412C, respective control signals A, B, and C, are generated (e.g., by a controller), each of which is to operate a corresponding actuator A, B, and C. Blocks 412A, 412B, and 412C may be executed in any order. Responsive to the corresponding control signal received, at block 416A actuator A moves a corresponding lens group A by a first amount on the optical axis in a direction toward the object side and away from the image side. At block 416B actuator B moves lens group B by a second amount on the optical axis in an opposite direction, which is toward the image side (e.g., away from the object side). At block 416C actuator C moves lens group C by a third amount on the optical axis in the direction toward the image side (away from the object side). Generally the distances moved by each of the lens groups A, B, C, will not be the same. Instead, the distances moved are determined (e.g. by control circuitry) based on the change in magnification to be achieved. The method ends at 420.

Figure 5:
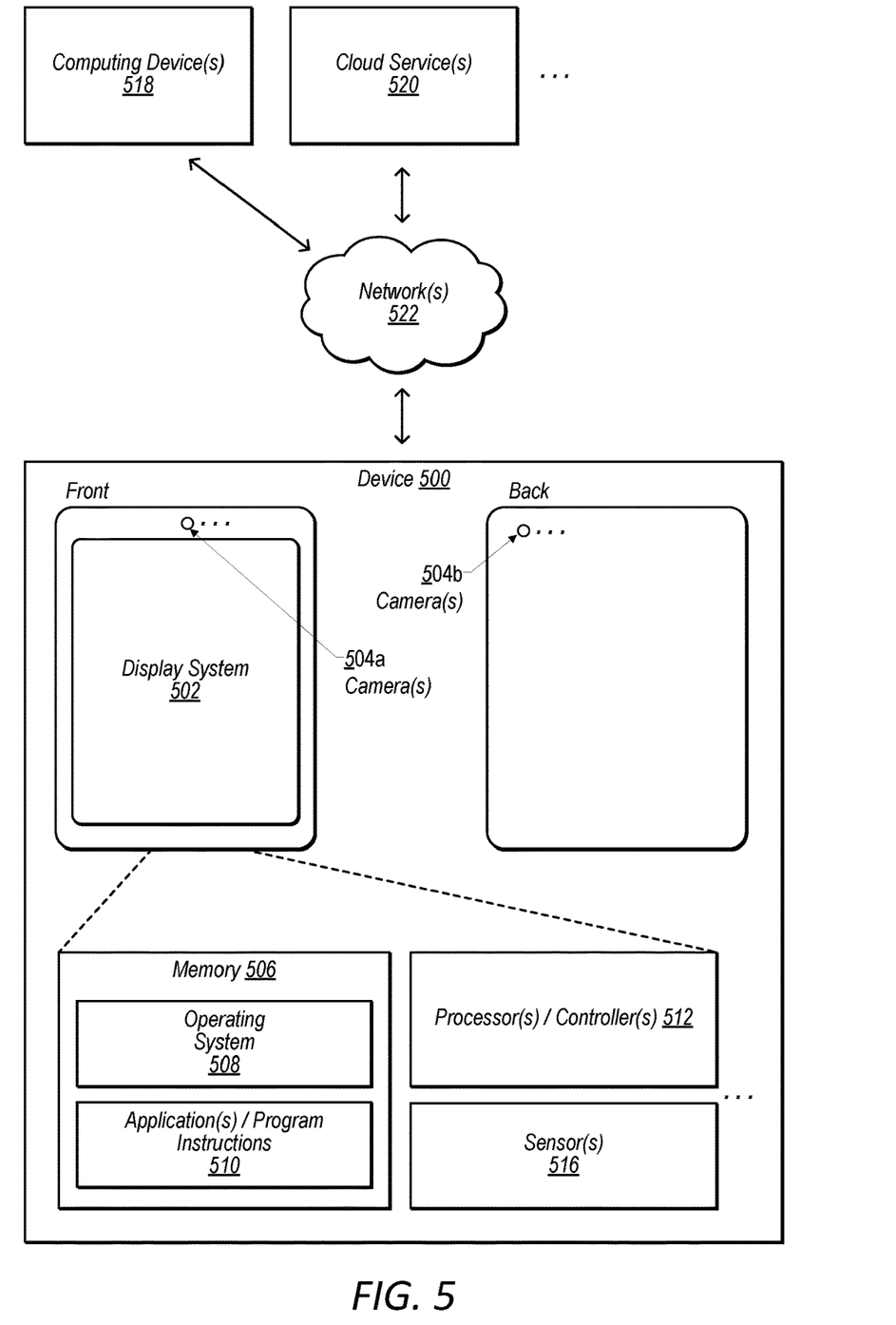
FIG. 5 is an illustration of a device that includes a camera employing a lens system as described herein, according to some embodiments

FIG. 5 illustrates a schematic representation of an example device 500 that may include a camera (e.g., camera 100 in FIG. 1) that includes moveable lens groups (e.g., as described above with reference to FIGS. 1-4), according to some embodiments, in accordance with some embodiments. In some embodiments, the device 500 may be a mobile device and/or a multifunction device. In various embodiments, the device 500 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 500 may include a display system 502 (e.g., comprising a display and/or a touch-sensitive surface) and/or one or more cameras 504. In some non-limiting embodiments, the display system 502 and/or one or more front-facing cameras 504a may be provided at a front side of the device 500, e.g., as indicated in FIG. 5. Additionally, or alternatively, one or more rear-facing cameras 504b may be provided at a rear side of the device 500. In some embodiments comprising multiple cameras 504, some or all of the cameras may be the same as, or similar to, each other. Additionally, or alternatively, some or all of the cameras may be different from each other. In various embodiments, the location(s) and/or arrangement(s) of the camera(s) 504 may be different than those indicated in FIG. 5.

Among other things, the device 500 may include memory 506 (e.g., comprising an operating system 508 and/or application(s)/program instructions 510), one or more processors and/or controllers 512 (e.g., comprising CPU(s), memory controller(s), display controller(s), and/or camera controller(s), etc.), and/or one or more sensors 516 (e.g., orientation sensor(s), proximity sensor(s), and/or position sensor(s), etc.). In some embodiments, the device 500 may communicate with one or more other devices and/or services, such as computing device(s) 518, cloud service(s) 520, etc., via one or more networks 522. For example, the device 500 may include a network interface (e.g., network interface 610) that enables the device 500 to transmit data to, and receive data from, the network(s) 522. Additionally, or alternatively, the device 500 may be capable of communicating with other devices via wireless communication using any of a variety of communications standards, protocols, and/or technologies.

Figure 6:
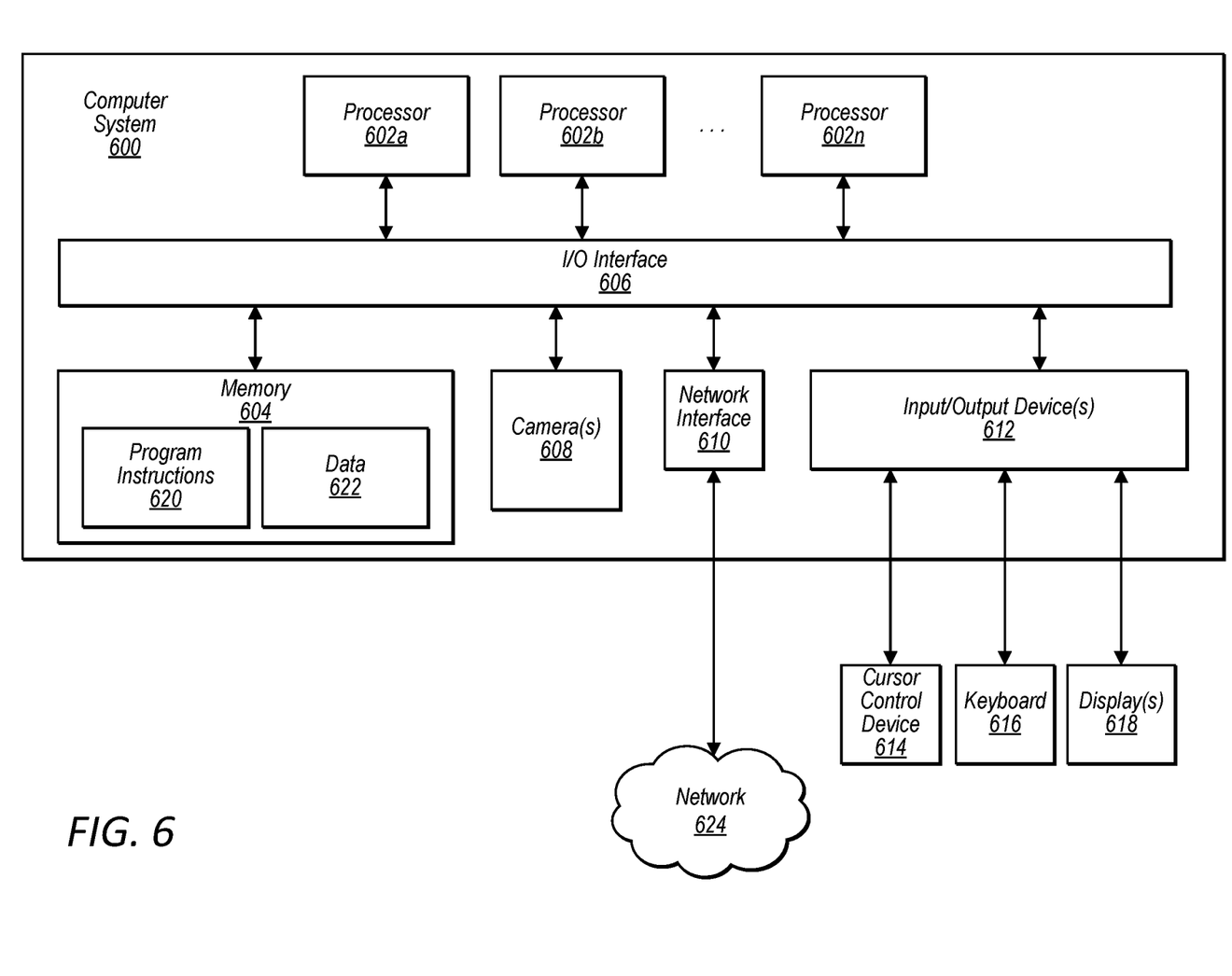
FIG. 6 illustrates an example computer system that includes a camera employing a lens system as described herein, according to some embodiments.

FIG. 6 illustrates a schematic block diagram of an example computing device, referred to as computer system 600, that may include or host embodiments of a camera that includes moveable lens groups (e.g., as described above with reference to FIGS. 1-4), according to some embodiments, e.g., as described herein with reference to FIGS. 1-5. In addition, computer system 600 may implement methods for controlling operations of the camera and/or for performing image processing images captured with the camera. In some embodiments, the device 500 (described herein with reference to FIG. 5) may additionally, or alternatively, include some or all of the functional components of the computer system 600 described herein.

The computer system 600 may be configured to execute any or all of the embodiments described above. In different embodiments, computer system 600 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 600 includes one or more processors 602 coupled to a system memory 604 via an input/output (I/O) interface 606. Computer system 600 further includes one or more cameras 608 coupled to the I/O interface 606. Computer system 600 further includes a network interface 610 coupled to I/O interface 606, and one or more input/output devices 612, such as cursor control device 614, keyboard 616, and display(s) 618. In some cases, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 602, or a multiprocessor system including several processors 602 (e.g., two, four, eight, or another suitable number). Processors 602 may be any suitable processor capable of executing instructions. For example, in various embodiments processors 602 may be general-purpose or embedded processors implementing any of a variety of instruction set architectures (ISAs), such as the x86, PowerPC, SPARC, or MIPS ISAs, or any other suitable ISA. In multiprocessor systems, each of processors 602 may commonly, but not necessarily, implement the same ISA.

System memory 604 may be configured to store program instructions 620 accessible by processor 602. In various embodiments, system memory 604 may be implemented using any suitable memory technology, such as static random access memory (SRAM), synchronous dynamic RAM (SDRAM), nonvolatile/Flash-type memory, or any other type of memory. Additionally, existing camera control data 622 of memory 604 may include any of the information or data structures described above. In some embodiments, program instructions 620 and/or data 622 may be received, sent or stored upon different types of computer-accessible media or on similar media separate from system memory 604 or computer system 600. In various embodiments, some or all of the functionality described herein may be implemented via such a computer system 600.

In one embodiment, I/O interface 606 may be configured to coordinate I/O traffic between processor 602, system memory 604, and any peripheral devices in the device, including network interface 610 or other peripheral interfaces, such as input/output devices 612. In some embodiments, I/O interface 606 may perform any necessary protocol, timing or other data transformations to convert data signals from one component (e.g., system memory 604) into a format suitable for use by another component (e.g., processor 602). In some embodiments, I/O interface 606 may include support for devices attached through various types of peripheral buses, such as a variant of the Peripheral Component Interconnect (PCI) bus standard or the Universal Serial Bus (USB) standard, for example. In some embodiments, the function of I/O interface 606 may be split into two or more separate components, such as a north bridge and a south bridge, for example. Also, in some embodiments some or all of the functionality of I/O interface 606, such as an interface to system memory 604, may be incorporated directly into processor 602.

Network interface 610 may be configured to allow data to be exchanged between computer system 600 and other devices attached to a network 624 (e.g., carrier or agent devices) or between nodes of computer system 600. Network 624 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 610 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 612 may, in some embodiments, include one or more display terminals, keyboards, keypads, touchpads, scanning devices, voice or optical recognition devices, or any other devices suitable for entering or accessing data by one or more computer systems 600. Multiple input/output devices 612 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 610.

Those skilled in the art will appreciate that computer system 600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An optical system, comprising:
   a light folding element configured to reflect received light onto an optical axis;
   at least three lens groups, each lens group comprising one or more respective lens elements, each lens group positioned along the optical axis so as to receive and refract at least a portion of the light directed along the optical axis; and
   at least three actuators, each actuator coupled with a respective one of the lens groups, each of the actuators configured to:
      receive a corresponding signal indicating a corresponding direction of displacement along the optical axis for the respective lens group; and
      in response to receipt of the corresponding signal, move the respective lens group along the optical axis by a corresponding displacement in the corresponding direction of displacement,
      wherein to increase a focal length of the optical system, the at least three actuators are configured to:
         move a particular one of the at least three lens groups along the optical axis in a direction toward an image plane toward which the received light is directed; and
         move two others of the at least three lens groups along the optical axis in another direction that is away from the image plane;
   wherein an f-number of the optical system is less than f/3.0.

2. The optical system of claim 1, wherein a first one of the at least three actuators is configured to displace one of the lens groups in one direction along the optical axis while two others of the at least three actuators displace two others of the at least three lens groups in an opposite direction along the optical axis.

3. The optical system of claim 1, wherein to decrease a focal length of the optical system, the at least three actuators are configured to:
   move a particular one of the at least three lens groups along the optical axis in a direction away an image plane toward which the received light is directed; and
   move two others of the at least three lens groups along the optical axis in another direction that is toward the image plane.

4. The optical system of claim 1, wherein the light folding element comprises a mirror, or a prismatic element having a refractive index greater than or equal to 1.7.

5. The optical system of claim 1, wherein the optical system has a focal length C at a maximum focal length state associated with the optical system, and one of the lens groups that is closer to the light folding element along the optical axis than others of the lens groups, has a negative refractive power and a focal length B and satisfies a relationship that a ratio of the focal length B to the focal length C, (B/C), is between −0.6 and −0.1.

6. The optical system of claim 1, wherein the optical system has a 35 mm equivalent focal length of at least 78 millimeters and less than or equal to 130 millimeters.

7. The optical system of claim 1, the at least three lens groups comprising, in order along the optical axis:
   a first lens group comprising a fixed lens having a positive refractive power and fixed in position on the optical axis;
   a second lens group comprising one or more lenses and having a negative refractive power and movable along the optical axis;
   a third lens group comprising one or more lenses and having a positive refractive power, wherein the third lens group is fixed in position along the optical axis;
   a fourth lens group comprising one or more lenses and having positive refractive power, wherein the fourth lens group is movable along the optical axis;
   a fifth lens group comprising one or more lenses and having negative refractive power, wherein the fifth lens group is movable along the optical axis; and a sixth lens group comprising one or more lenses and having a positive refractive power, wherein the sixth lens group is fixed in location along the optical axis.

8. The optical system of claim 1, wherein the optical system is configured to provide a 35 mm equivalent focal length between 78 mm and 130 mm.

9. The optical system of claim 1, wherein the f-number of the optical system is between f/2.3 and f/2.9.

10. A method, comprising:
receiving, by a controller, a request to change a focal length associated with an optical system comprising a light folding element and a plurality of lens groups positioned serially on an optical axis; and
responsive to the request, sending respective signals from the controller to each of at least three actuators, each of the at least three actuators configured to move a respective lens group of the optical system along the optical axis responsive to receipt of the respective signal that results in changing the focal length associated with the optical system, sending the respective signals comprising:
sending a first signal to a first actuator of the at least three actuators to move the respective lens group for the first actuator in a first direction along the optical axis;
sending a second signal to a second actuator of the at least three actuators to move the respective lens group for the second actuator in a second direction that is opposite to the first direction along the optical axis; and
sending a third signal to a third actuator of the at least three actuators to move the respective lens group for the third actuator in the second direction along the optical axis,
wherein an f-number of the optical system is less than f/3.0.

11. The method of claim 10, further comprising:
receiving a request at the controller to focus an output image onto an image plane resulting from light refracted by the optical system; and
responsive to the request, sending a corresponding focus signal to one of the at least three actuators to change a position of the respective lens group that is closer to the image plane of the at least three lens groups configured to be moved by a respective actuator.

12. A camera, comprising:
an image sensor configured to sense light impinging on a surface of the image sensor that intersects an optical axis;
an optical system comprising:
a light-folding element configured to receive light at an object side of the lens system along an input axis, and to reflect the received light along the optical axis; and
at least three lens groups located along the optical axis between the light-folding element and the image sensor and configured to refract the received light that has been reflected along the optical axis for an image,
wherein the optical system has a focal length C at a maximum magnification, one of the lens groups has a focal length B, and wherein a ratio of the focal length B to the focal length C, (B/C), is within a range of values from −0.6 to −0.1;
wherein an f-number of the optical system is less than f/3.0;
at least three actuators each configured to move a respective one of the at least three lens groups; and
a controller configured to receive a request to change a focal length of the optical system from a current focal length to a requested focal length, and in response to the request, send a plurality of different commands, each command sent to a corresponding actuator of the at least three actuators;
wherein each actuator of the at least three actuators is configured to receive a respective one of the plurality of commands and responsive to receipt of the respective command:
move the respective one of the lens groups along the optical axis in a corresponding direction of movement indicated in the corresponding command.

13. The camera of claim 12, wherein the requested focal length is greater than the current focal length and the controller, in response to the received request, is configured to:
send a corresponding signal to one of the actuators, to move the respective lens group along the optical axis in a particular direction that is toward an image plane toward which the received light is directed; and
send corresponding signals to each of two others of the actuators to move respective ones of the lens groups in an opposite direction that opposite to the particular direction.

14. The camera of claim 12, wherein the requested focal length is less than the current focal length and the controller, in response to the received request, is configured to:
send a corresponding signal to one of the actuators to move the respective lens group along the optical axis in a particular direction that is away from an image plane toward which the received light is directed; and
send corresponding signals to each of two others of the actuators to move respective ones of the lens groups in an opposite direction that is opposite to the particular direction.

15. The camera of claim 12, wherein one of the lens groups comprises a lens with positive refractive power and that has an Abbe number that is greater than 60.

16. The camera of claim 12, wherein a height of the optical system, measured on an axis perpendicular to the optical axis, is less than or equal to 6 millimeters.

17. The camera of claim 12, the at least three actuators configured to move the at least three lens groups along the optical axis that causes a variation in 35 mm equivalent focal length between 78 mm and 130 mm.

* * * * *